United States Patent [19]

Hagemann et al.

[11] Patent Number: 4,477,401
[45] Date of Patent: Oct. 16, 1984

[54] METHOD OF MANUFACTURING A DIELECTRIC

[75] Inventors: Hans J. Hagemann; Siegfried Hünten; Rolf Wernicke, all of Aachen, Fed. Rep. of Germany; Cornelius J. Klomp; Willem Noorlander, both of Eindhoven, Netherlands

[73] Assignee: U.S. Philips Corporation, New York, N.Y.

[21] Appl. No.: 414,155

[22] Filed: Sep. 2, 1982

[30] Foreign Application Priority Data

Sep. 25, 1981 [DE] Fed. Rep. of Germany ....... 3138177

[51] Int. Cl.³ .............................................. C04B 35/46
[52] U.S. Cl. ...................................... 264/61; 264/65; 264/345

[58] Field of Search ......................... 264/82, 61, 66, 65, 264/345

[56] References Cited

U.S. PATENT DOCUMENTS 3,920,781 11/1975 Eror et al. ............................. 264/61
4,131,444 12/1978 Walker ................................. 264/82

Primary Examiner—John A. Parrish
Attorney, Agent, or Firm—Marc D. Schechter

[57] ABSTRACT

A method of manufacturing a dielectric from ferroelectric ceramic material having a perovskite structure with the basic formula $ABO_3$. In the method, the dielectric is sintered in a reducing atmosphere and the sintered body is aftertreated at a temperature in the range of from 500° to 900° C. in an $N_2$—$O_2$ atmosphere. The atmosphere contains a quantity of $O_2$ corresponding to a partial $O_2$-pressure between $10^{-5}$ bar and 0.2 bar.

10 Claims, No Drawings

METHOD OF MANUFACTURING A DIELECTRIC

BACKGROUND OF THE INVENTION

The invention relates to a method of manufacturing a dielectric from a ferroelectric ceramic material having a perovskite structure with the basic formula $ABO_3$. In the method, the dielectric is densely sintered in a reducing atmosphere at a temperature in the range from 1320° to 1450° C.

With the dielectric, multilayer capacitors, for example, can be manufactured. To manufacture multilayer capacitors, the ceramic material is densely sintered together with metal electrodes. Monolithic substrates can also be manufactured from the ceramic material, for example as discs or tubes. These components can be provided at their major surfaces with metal layers, for example electrode layers, either prior to or after sintering.

For cost considerations it is efficacious to use base metals or alloys of base metals for the electrodes. Such base metals may be, for example, nickel or chromium and alloys thereof.

In order to obtain particularly high capacitances, ferroelectric ceramic materials having perovskite structure are used as dielectrics. The dielectrics have the basic formula $ABO_3$. In practice the A/B ratio is often chosen to deviate only slightly from 1, and several different ions are used both for the ions in the A-position and in the B-position in the perovskite-lattice. In order to be able to manufacture inexpensive capacitors with base metal electrodes, the ceramic material is densely sintered in a reducing atmosphere together with the electrode layers. This method relates in particular, to the production of multilayer capacitors.

Such dielectrics and multilayer capacitors manufactured therefrom with base metal electrodes are known from U.S. Pat. No. 3,920,781. In this patent, the A/B ratio lies within the range of from 0.95 to 1.00, and small quantities of the bivalent A-ions or of the quadrivalent B-ions are replaced by ions of a lower valency ("acceptor dopants"). The dielectrics are densely sintered in the temperature range from 1000° C. to 1400° C. in a reducing atmosphere having a partial oxygen pressure $P_{O_2} < 10^{-7}$ bar.

It has been found that the manufacture of these capacitors is particularly complicated with respect to maintaining the A/B-ratio in the desired range and preventing contamination by impurities. It has also been found that these capacitors do not exhibit optimum electrical properties in that the electric characteristic values thereof do not remain stable in life tests.

SUMMARY OF THE INVENTION

It is an object of the invention to manufacture perovskite dielectrics as described above in such manner that the electrical properties of capacitors manufactured with the dielectrics are improved and in particular remain stable in life tests.

According to the invention, this object is achieved by aftertreating the sintered body at a temperature in the range of from 500° to 900° C. for a period of time from 0.5 to 8 hours in an $N_2$—$O_2$ atmosphere which contains a quantity of $O_2$ corresponding to a partial $O_2$-pressure, $P_{O_2}$ between $10^{-5}$ bar and 0.2 bar.

According to a further embodiment of the invention, the sintered body is aftertreated at a temperature from 700° to 800° C. for 1 to 4 hours in an $N_2$—$O_2$ atmosphere, which contains a quantity of $O_2$ corresponding to a partial pressure of $2.10^{-4}$ bar.

This separate after-treatment step under the influence of oxygen has the advantage that on the one hand the oxygen vacancies formed in the ceramic material by the sintering in a reducing atmosphere are occupied again, and on the other hand detrimental oxidation of electrode metal electrode does not yet occur. When $Cr^{3+}$ is used as an acceptor doping, the valency of the Cr doping is simultaneously increased from 3+ to 4+ by the aftertreatment.

A further advantage of the method according to the invention is that aftertreatment of the ceramic material provided with base metal electrodes is possible even in air when the aftertreatment is carried out in the temperature range from 500° to 600° C. For example, in this case it is not necessary to use gas-tight furnaces.

According to advantageous embodiments of the invention, carbonates and/or oxides (according to the basic formula below) are used for the manufacture of the dielectric:

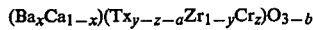

in which $0.80 \leq x \leq 0.92$ $0.80 \leq y \leq 0.88$ $0.003 \leq z \leq 0.010$ $0.00 \leq a \leq 0.04$ $0.00 \leq b \leq z/2$ The value of b adjusts itself depending on the values of x, y, z and a during sintering.

In particular carbonates and/or oxides according to the basic formula below are used:

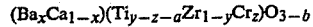

in which $x \approx 0.86$ $0.82 \leq y \leq 0.84$ $0.003 \leq z \leq 0.010$ $a \approx 0.025$ $0.00 \leq b \leq z/2$ According to another advantageous embodiment of the invention, the starting materials for the dielectric are calcined in air for approximately 15 hours at a temperature in the range of from 1150° to 1250° C., preferably at 1200° C.

When the process is carried out by (1) mixing the compounds forming the perovskite phase with the compound of the dopant (Cr), and (2) calcining the mixture in the temperature range of from 1150° C. to 1250° C., $CO_2$ is advantageously split off from the carbonates; in the subsequent dense sintering process gas formation no longer takes place, and the final product will have a denser structure.

A further advantage of this process step is that perovskite formation is already finished, and an extreme mixed crystal formation has taken place.

According to a further embodiment of the invention 0.2 to 2.0 mol.% of $Ba_2TiSi_2O_8$ calcined in the temperature range from 1100° to 1150° C. (hereinafter referred to as BTS) is added as a sintering aid to the starting material for the dielectric.

The sintering aid is not incorporated in the perovskite lattice. The sintering aid promotes the dense sintering of the dielectric, starting with the formation of a liquid phase, at a lower temperature, but it hardly influences the electrical properties of the dielectric.

In addition to the above-mentioned advantages, the following further advantages are obtained by the method according to the invention. By choosing $a>0$ and adding the sintering aid it is possible to densely sinter the ceramic dielectric at a temperature below 1400° C. (at least 98% of the theoretical density is reached), and to simultaneously reach a very uniform microstructure with a grain size in the range of from 5 to 10 μm. Both parameters are important, for example, to be able to manufacture high-grade capacitors. Moreover, when multilayer capacitors have to be manufactured, it is of importance to use sintering temperatures below 1400° C. when nickel electrodes are used; temperatures above 1400° C. are too close to the melting-point of the nickel and partially incoherent electrode layers are formed.

As a result of using chromium as an acceptor dopant, a widening of the temperature characteristic for the dielectric constant, $\epsilon(T)$, a reduction of the loss factor, tan δ, and an increase in the insulation resistance $R_i$ are achieved as compared with corresponding but undoped dielectric materials. At a value for $a>0$ and with Cr-doping complete reoxidation of the ceramic material becomes possible by the aftertreatment in an $N_2-O_2$ atmosphere. Consequently, the disadvantage of all the known base metal electrode multilayer capacitors namely the tendency, (increased with respect to capacitors sintered in air) toward deterioration of the electrical properties in or after a life test, is overcome. Such life tests are carried out, for example, at a temperature of 85° C. at a voltage which corresponds to twice or one-and-a-half times the value of the specified operating direct voltage for a period of time from 200 hours and 1000 hours, respectively.

When NiO powder or CoO powder is used as a starting material for electrodes, the following advantage is obtained. Multilayer capacitors are manufactured, for example, from ceramic foils as dielectrics and imprinted metal pastes as electrodes. Both components comprise organic binders which have to be annealed carefully in an oxidizing atmosphere because otherwise carbon residues remain which can easily give rise to cracks in the capacitors (at right angles to the electrodes). When, for example, Ni-pastes are annealed to a sufficient extent, the Ni-powder consisting of very fine particles begins to oxidize. Oxidation of the Ni-powder increases the tendency to form cracks or to delaminate (form gaps between the layers in the sintered capacitor). These problems are solved by using layers of NiO pastes, which are converted into Ni-layers when the capacitors (after complete annealing of the binder) are sintered in a reducing atmosphere.

DESCRIPTION OF THE PREFERRED EMBODIMENTS

I. Disc capacitors manufactured with the dielectric according to the invention.

The starting materials for the basic perovskite compound were $BaCO_3$, $CaCO_3$, $TiO_2$ in the form of rutile, and $ZrO_2$. For the acceptor doping $Cr_2O_3$ was provided.

For the manufacture of ceramic test bodies for measuring purposes, all starting materials, hence the starting materials for the basic perovskite compound as well as the starting material for the doping of the desired composition, were weighed accordingly. Thereafter, the weighed materials were formed into a slurry in alcohol and, mixed in a ball mill for 2 hours. After drying the slurry, the resulting powder was calcined at 1200° C. in air for 15 hours. The calcined powders together with a desired quantity, for example 0.5 mol.%, of the sintering aid BTS were ground dry in a planetary ball mill for 1 hour. The ground powder was then compressed hydrostatically to form discs having a diameter of 5 mm, a thickness of 0.5 mm and a density of 60 to 65%. Electrodes consisting of a paste of Ni-powder and a suitable organic binder were provided on the major surfaces of the ceramic discs.

Cellulose acetate was used as a binder to form the compressed discs. After annealing, the unsintered (green) binder the capacitor bodies were sintered in a flowing mixture of $N_2$ (95% by volume) with 5 volume % $H_2$ at various sintering temperatures. The best results were obtained at sintering temperatures in the range of from 1340° C. to 1400° C. The capacitor bodies were heated at a rate of approximately 3° C./minute. They were kept at the maximum temperature for 14 hours.

After cooling, the capacitor bodies were aftertreated at 800° C. in an $N_2-O_2$ atmosphere comprising a quantity of $O_2$ corresponding to a partial $O_2$ pressure $P_{O2}=2\times10^{-4}$ bar. The optimum duration of the aftertreatment was 8 to 10 hours.

From the tables below it will become apparent in what manner the variation of individual parameters influences the electrical properties of the capacitors.

1. Promoting the increase in density of the sintered body by the addition of sintering aid in the form of $Ba_2TiSi_2O_8$ (BTS) or $SiO_2$.

TABLE 1

| S.a. | $T_s^{min}$ [°C.] | ε | tan δ | RC [s] |
|---|---|---|---|---|
| without | >1470 | 7000 | 0.02 | 300 |
| 0.5 mol. % BTS | 1430 | 6800 | 0.012 | 400 |
| 1.0 mol. % BTS | 1430 | 7200 | 0.015 | 250 |
| 1.0 mol. % SiO$_2$ | 1400 | 9500 | 0.170 | <10 |

In Table 1:
S.a. = sintering aid
$T_s^{min}$ = minimum sintering temperature necessary for the increase in density ε = dielectric constant ⎫
                          ⎬ at 25° C.
tan δ = loss factor ⎭

RC = time constant
Material: $(Ba_{0.86}Ca_{0.14})(Ti_{0.81}Zr_{0.18}Cr_{0.005})O_{3-b}$.

The ceramic material for the dielectric has an addition of 0.5 to 1.0 mol.% BTS. The BTS was first calcined in the temperature range from 1100° to 1150° C.

From the values of Table 1 it appears that the addition of the sintering aid BTS hardly influences the electrical values. The addition of $SiO_2$ as a sintering aid is not recommended. Although the dielectric constant is considerably larger, the values of the loss factor and the time constant become unacceptable.

2. Promotion of the sintering and of the electrical properties by choosing a>0.

TABLE 2

| a | $T_s^{min}$ [°C.] | d [gcm$^{-3}$] | ε | tan δ | RC [s] |
|---|---|---|---|---|---|
| −0.01 | >1450 | — | — | — | — |
| 0 | 1400 | 5.54 | 9200 | 0.010 | 500 |
| 0.01 | 1370 | 5.68 | 10300 | 0.010 | 1000 |
| 0.015 | 1350 | 5.70 | 8700 | 0.010 | 900 |
| 0.025 | 1340 | 5.69 | 8700 | 0.017 | 800 |
| 0.030 | 1380–1400 | 5.66 | 7800 | 0.010 | 1000 |
| 0.040 | >1450 | — | — | — | — |

In Table 2: d[g cm$^{-3}$]=density

Material: $(Ba_{0.86}Ca_{0.14})(Ti_{0.815-a}Zr_{0.18}Cr_{0.005})O_{3-b}$ + 0.5 mol.% BTS. The value of a indicates the deviation from stoichiometry A/B=1.

3. Widening of the temperature characteristic of the dielectric constant ε and reduction of the loss factor tan δ by the Cr-doping.

TABLE 3

| z | ε | Δε | tan δ | RC [s] |
|---|---|---|---|---|
| 0 | 12500 | +30%/−60% | 0.030 | 1200 |
| 0.001 | 12000 | +25%/−55% | 0.025 | 1300 |
| 0.002 | 11000 | +17%/−40% | 0.016 | 2200 |
| 0.005 | 7600 | +10%/−20% | 0.014 | 1000 |

Δε means the maximum deviation upwards and downwards of the ε values at 25° C. in the temperature range from +10° C. to +85° C.

Material: $(Ba_{0.86}Ca_{0.14})(Ti_{0.81-z}Zr_{0.18}Cr_z)O_{3-b}$ + 0.5 mol.% BTS.

4. Improvement of the stability of the electrical characteristic values in life tests at a temperature of 85° C. and a direct voltage of 2 kV/mm by aftertreatment in an $N_2$—$O_2$ atmosphere at a partial $O_2$ pressure of $2\times10^{-4}$ bar at a temperature of 800° C.

TABLE 4

| | ρ (sintered body after-treated) | ρ (sintered body untreated) |
|---|---|---|
| 0.1 h | $1.3 \times 10^{12}$ | $1.5 \times 10^{11}$ |
| 1 h | $1.5 \times 10^{12}$ | $4 \times 10^{11}$ |
| 10 h | $1.8 \times 10^{12}$ | $5 \times 10^{11}$ |
| 100 h | $2.1 \times 10^{12}$ | $5 \times 10^{10}$ |
| 500 h | $2.2 \times 10^{12}$ | $10^7$ |
| 1000 h | $2.2 \times 10^{12}$ | $10^4$ |

In Table 4 the insulation resistivities ρ are indicated at 85° C. in Ω.cm. The first column is the duration of each life test in hours.

Material: $(Ba_{0.86}Ca_{0.14})(Ti_{0.80}Zr_{0.18}Cr_{0.005})O_{3-b}$ + 0.5 mol.% BTS.

II. Multilayer capacitors manufactured with the dielectric according to the invention.

The starting materials for the basic perovskite compound were $BaCO_3$, $CaCO_3$, $TiO_2$ in the form of rutile, and $ZrO_2$. The acceptor dopant was $Cr_2O_3$.

For the manufacture of ceramic test bodies for measuring purposes, all starting materials were weighed in, and then mixed in a ball mill for 15 hours in water to form a slurry. After drying, the powder was calcined at 1200° C. in air for 15 hours. The resulting powders were formed to a slurry in water and mixed with the addition of a suitable binder, for example polyvinyl alcohol. 50 μm thick foils were then poured from the slurry and were printed with an NiO paste to form electrode layers after drying.

For forming of a sandwich structure, 5 foils provided with electrode paste were stacked and compressed. The binders of the electrode paste and of the green ceramic foils were then annealed in air for 16 hours by slowly heating to a temperature of 640° C. This sandwich structure was sintered for 2 hours at a temperature of 1340° C. in a flowing mixture of 94 volume % of wetted $N_2$ with 6 volume % of $H_2$. The heating and cooling cycle corresponded to that which is described above.

After cooling, the sintered bodies were aftertreated for 4 hours at 700° C. in an $N_2$—$O_2$ atmosphere containing a quantity of $O_2$ corresponding to a partial $O_2$ pressure $P_{O2}=2\times10^{-4}$ bar. Mechanical contacts of Cr/Cu were then provided on the sintered bodies by cathode sputtering. The thicknesses of the dielectric layers was 28 μm.

The following electrical characteristic values were measured for these multilayer capacitors:

C=60 to 80 nF;
ε at 25° C.=4500;
tan δ at 1 kHz, 1 $V_{eff}$ and 25° C.=150×10$^{-4}$;
temperature dependence of the capacitance: maximum +15% to −52% in the temperature range from +10° C. to +85° C.
Insulation resistance $R_i$ at 25° C., 50 V and 60 s after applying the voltage=50 to 100 GΩ;
time constant RC=5,000 to 10,000 s;
insulation resistance $R_i$ at 85° C., 50 V and 60 s after applying the voltage=10 to 20 GΩ;
time constant RC=500 to 1,000 s.

After a life test at 85° C. for 1,000 hours at a voltage of 56 V≙(2 kV/mm) the following electrical characteristic values were measured:

ΔC at 25° C.=−10% (ΔC means variation of the capacitance by the life test);
tan δ at 25° C., 1 kHz and 1 $V_{eff}$=200 to 250×10$^{-4}$;
insulation resistance $R_i$ at 25° C., 50 V and 60 s after applying the voltage=20 to 50 GΩ;
time constant RC=1,000 to 3,000 s;
insulation resistance $R_i$ at 85° C., 50 V and 60 s after applying the voltage=2 to 5 GΩ;
time constant RC=50 to 150 s.

What is claimed is:

1. A method of manufacturing ceramic capacitors comprising the steps of:
providing an unsintered capacitor body comprising a ferroelectric material having a perovskite structure and having the general formula $ABO_3$;
providing an electrode paste on the capacitor body to form a composite body, said paste comprising a base or oxide of a base metal selected from the group consisting of Ni, Cr or alloys thereof;
sintering the composite body in a reducing atmosphere at a temperature in the range of from 1320° to 1450° C. to form a sintered body having a metal electrode thereon;
cooling the sintered body; and then aftertreating the sintered body by heating it at a temperature of from 500° to 900° C. for a period of time of from 0.5 to 4 hours in a nitrogen-oxygen atmosphere having a partial oxygen pressure of from $10^{-5}$ bar to 0.2 bar, wherein the temperature, duration, and partial oxygen pressure are chosen such that there is substantially no oxidation of the metal electrode.

2. A method as claimed in claim 1, wherein the aftertreatment is at a temperature of from 700° to 800° C. for a period of time of from 1 to 4 hours in a nitrogen-oxygen atmosphere having a partial oxygen pressure of $2 \times 10^{-4}$ bar.

3. A method as claimed in claim 2, wherein the ferroelectric material has a composition given by the formula

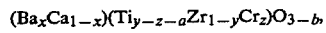

where $0.80 \leq x \leq 0.92$ $0.80 \leq y \leq 0.88$ $0.003 \leq z \leq 0.010$ $0.00 \leq a \leq 0.04$, and $0.00 \leq b \leq z/2$ 4. A method as claimed in claim 3, wherein $x \approx 0.86$, $0.82 \leq y \leq 0.84$, $0.03 \leq z \leq 0.010$, $a \approx 0.025$, $0 \leq b \leq z/2$.

5. A method as claimed in claim 4, wherein the unsintered capacitor body is formed by the steps of:
providing a starting material comprising a mixture of carbonates or oxides of barium, calcium, titanium, zirconium, and chromium; and
calcining the mixture in air for 15 hours at a temperature of from 1150° to 1250° C.

6. A method as claimed in claim 5, wherein the calcining step is at a temperature of 1200° C.

7. A method as claimed in claim 6, wherein the unsintered capacitor body is formed by adding from 0.2 to 2.0 mole% of $Ba_2TiSi_2O_8$ to the calcined mixture.

8. A method as claimed in claim 7, wherein the unsintered capacitor body is formed by adding from 0.5 to 1.0 mole% $Ba_2TiSi_2O_8$ to the calcined mixture.

9. A method as claimed in claim 8, wherein the electrode paste comprises NiO or CoO and an organic binder.

10. A method as claimed in claim 9, wherein the composite body is sintered in a nitrogen-hydrogen atmosphere consisting of 75 to 98 volume percent nitrogen with the remainder hydrogen.

* * * * *

UNITED STATES PATENT AND TRADEMARK OFFICE
CERTIFICATE OF CORRECTION

PATENT NO. : 4,477,401
DATED : October 16, 1984
INVENTOR(S) : HANS J. HAGEMANN ET AL It is certified that error appears in the above-identified patent and that said Letters Patent is hereby corrected as shown below:

In the claims:

Claim 1, line 8, after "base" insert --metal--.

Signed and Sealed this

Sixteenth Day of April 1985

[SEAL]

Attest:

DONALD J. QUIGG

*Attesting Officer*     *Acting Commissioner of Patents and Trademarks*